(12) United States Patent
Besson et al.

(10) Patent No.: US 6,401,843 B1
(45) Date of Patent: Jun. 11, 2002

(54) DRILLING HEAD WITH A CONE ROCK BIT

(75) Inventors: Alain Besson, Saint Remy les Chevreuse; Patrick Fayaud, Angers; Bernard Tissier, Nyoiseau; Pierre Lecour, Le Kremlin Bicetre, all of (FR)

(73) Assignees: Hutchinson, Paris; Total, Paris la Defense, both of (FR)

( * ) Notice: Subject to any disclaimer, the term of this patent is extended or adjusted under 35 U.S.C. 154(b) by 0 days.

(21) Appl. No.: 09/533,925

(22) Filed: Mar. 23, 2000

(30) Foreign Application Priority Data

Mar. 26, 1999 (FR) ............................. 99 03813

(51) Int. Cl.⁷ ...................... E21B 10/22; E21B 10/24; F16J 15/447
(52) U.S. Cl. ...................... 175/359; 175/371; 277/371
(58) Field of Search ................. 175/354, 358, 175/359, 371, 372; 277/269, 371, 551, 562, 571, 572

(56) References Cited

U.S. PATENT DOCUMENTS

| | | | | |
|---|---|---|---|---|
| 3,529,840 A | * | 9/1970 | Durham et al. | 277/383 |
| 3,682,488 A | * | 8/1972 | Matsushima | 277/551 |
| 3,944,306 A | * | 3/1976 | Neilson | 384/94 |
| 4,262,759 A | * | 4/1981 | Young et al. | 175/227 |
| 4,289,321 A | * | 9/1981 | Cather, Jr. | 277/552 |
| 4,298,079 A | * | 11/1981 | Norlander et al. | 175/339 |
| 4,344,629 A | * | 8/1982 | Oelke | 277/306 |
| 4,981,303 A | * | 1/1991 | Matsushima et al. | 277/351 |
| 5,015,001 A | * | 5/1991 | Jay | 277/18 |
| 5,027,911 A | * | 7/1991 | Dysart | 175/57 |
| 5,167,419 A | * | 12/1992 | Robertson | 277/552 |
| 5,244,215 A | * | 9/1993 | Cather, Jr. et al. | 277/309 |
| 5,458,420 A | * | 10/1995 | Otto | 384/448 |
| 5,513,715 A | * | 5/1996 | Dysart | 175/371 |
| 5,553,870 A | * | 9/1996 | Czekansky et al. | 277/559 |

FOREIGN PATENT DOCUMENTS

| | | |
|---|---|---|
| DE | 41 07 678 | 9/1992 |
| DE | 196 14 946 | 10/1997 |
| GB | 2 101 238 | * 1/1983 |

OTHER PUBLICATIONS

Mike Hooper, et al., "The Design of a Mechanical Face Seal For a Roller Cone Drill Bit", The American Society of Mechanical Engineers Winter Annual Meeting, Dec. 1–6, 1991, pp. 1–11.*

* cited by examiner

Primary Examiner—David Bagnell
Assistant Examiner—Jennifer M. Hawkins
(74) Attorney, Agent, or Firm—Oblon, Spivak, McClelland, Maier & Neustadt, P.C.

(57) ABSTRACT

A drilling head with a cone rock bit, each cone having a stationary part and a rotary part which rotates about an axis of rotation. Also included is a dynamic sealing device between the stationary part and the rotary part. The sealing device is borne by the rotary party and has a first sealing lip and a second sealing lip, each of which forms a surface of revolution about the axis of rotation. Further, the first and second lips bear respectively against a first bearing face and a second bearing face secured to the stationary part. The first lip is oriented in such a way that it presses against the first bearing face under the action of the pressure, and the second lip is oriented in such a way that it moves away from the second bearing face under the action of the pressure of the lubricating product, so as to allow this product to fill a cavity and compensate for the pressure in the cavity.

20 Claims, 2 Drawing Sheets

DRILLING HEAD WITH A CONE ROCK BIT

BACKGROUND OF THE INVENTION

1. Field of the Invention

The present invention relates to a drilling head with a cone rock bit.

2. Discussion of the Background

A rock bit of this kind is generally fitted with three cones and is in fact known by the name of a three-cone bit and is intended to be used, in particular, for deep boreholes, for example going down 3000 to 4000 meters or even more.

The drilling head has to operate under arduous conditions, that is to say in the presence of an abrasive drilling sludge and strong vibration, at a pressure often in excess of 400 bar (for the aforementioned depths) and at temperatures which may exceed 150° C.

One of the crucial aspects of the rotary cones is their dynamic seal which has to remain effective under the aforementioned conditions.

There are currently two types of seals in existence which are used in the envisaged application, namely toric seals and metal-metal seals.

Drilling heads employing one or more toric seals are described, in particular, in American Patents U.S. Pat. No. 4,623,028 (Reed Tool Company), U.S. Pat. No. 5,456,327 (Smith International) and U.S. Pat. No. 5,129,471 (Hughes Tool Company).

Seals of the metal-to-metal type generally exhibit better life than toric seals. Seals of this type are described, for example in European Patent Application EP 138 737 (Hughes Tool), in American Patents U.S. Pat. No. 4,344,629, U.S. Pat. No. 4,824,123 and U.S. Pat. No. 4,822,057, all three of these being in the name of Smith International Inc., U.S. Pat. No. 4,838,365 (Reed Tool Company) and U.S. Pat. No. 4,306,727 (Reed Rock Bit Company).

The problems posed by the design of this kind of seal have been set out in the article by Mike Hooper and Mark Hommel which was published in the minutes of the ASME Winter Annual Meeting, Dec. 1–6, 1991, Atlanta-Ga., under the reference 91-WA-DE-11 (p. 1–11) of The American Society of Mechanical Engineers (345 E. 47 St. New-York N.Y. 10017).

SUMMARY OF THE INVENTION

The subject of the present invention is a drilling head with a cone rock bit, in which a cone is sealed by a device which may be made of elastomer and which affords better performance by comparison with the toric seals.

Another object of the present invention is for sealing to be provided by a device which has a long life.

Another object of the invention is to allow the moving part to have an amplitude of deformation or even angular dislocation without the sealing being affected.

Another object of the present invention is for the sealing to be accompanied by effective consideration given to the back pressure generated by a pressure-compensating system.

Another object of the present invention is for the sealing to be easily fit into the cone.

At least one of the aforementioned objects is achieved, according to the present invention, by a drilling head with a cone rock bit. Each cone has a stationary part and a part which rotates about an axis of rotation. Also included is a dynamic sealing device between the stationary part and the rotary part, which is intended to avoid the ingress of drilling matter. The stationary part includes a pressure-compensating system capable at its output of delivering a product for lubricating the seal at a desired back pressure. Further, the sealing device is borne by the rotary part and has a first sealing lip and a second sealing lip, each of which forms a surface of revolution about the axis of rotation.

In addition, the first and second lips bear respectively against a first bearing face and a second bearing face secured to the stationary part. The first bearing face includes, for example, a track defmed by an annulus, the axis of which is the axis of rotation of the cone, and the second bearing face includes, for example, a track defined by a cylinder, the axis of which is the axis of rotation of the cone. The first sealing lip also has an outer face facing toward the drilling matter and an inner face facing toward a cavity which forms a reservoir of lubricating product. The second sealing lip has an outer face facing toward the outlet of the pressure-compensating system and an inner face facing toward said cavity. Further, the first lip is oriented in such a way that it presses against the first bearing face under the action of the pressure, and the second lip is oriented in such a w)ay that it moves away from the second bearing face under the action of the back pressure of the lubricating product. This allows the product to fill the cavity and compensate for the pressure in the cavity, particularly between the outer and inner faces of the first lip.

The first and/or the second sealing lip are advantageously made of elastomer. The second lip may have an annular bulge with a double chamfer forming a sharp edge which makes the seal.

At least one lip advantageously has a backing spring, for example a spring with prestressed turns constituting a toric annulus.

According to a preferred embodiment, the first lip and the second lip are borne by a first armature that revolves about the axis of rotation and which is secured to the rotary part. Further, at least one of the first and second lips has an extension which forms a static seal between the first armature and a wall of the rotary part. The first armature may consist of a single piece or alternatively may be made up of at least two parts joined together.

According to a particularly advantageous embodiment, the first bearing face and the second bearing face form part of a second armature consisting of a part that revolves about the axis of rotation and which is secured to the rotary part. Further, the second armature has a seal which makes a static seal between it and the rotary part.

The drilling head may also have a third sealing lip with an outer face facing toward said drilling matter and an inner face facing toward the outer face of the first sealing lip. dr

BRIEF DESCRIPTION OF THE DRAWINGS

Other features and advantages of the invention will become more apparent from reading the description which will follow, which is given by way of nonlimiting example in conjunction with the drawings in which:

FIG. 1b depicts an enlarged detail of the seal according to FIG. 1a;

DESCRIPTION OF THE PREFERRED EMBODIMENTS

Figure 1A:
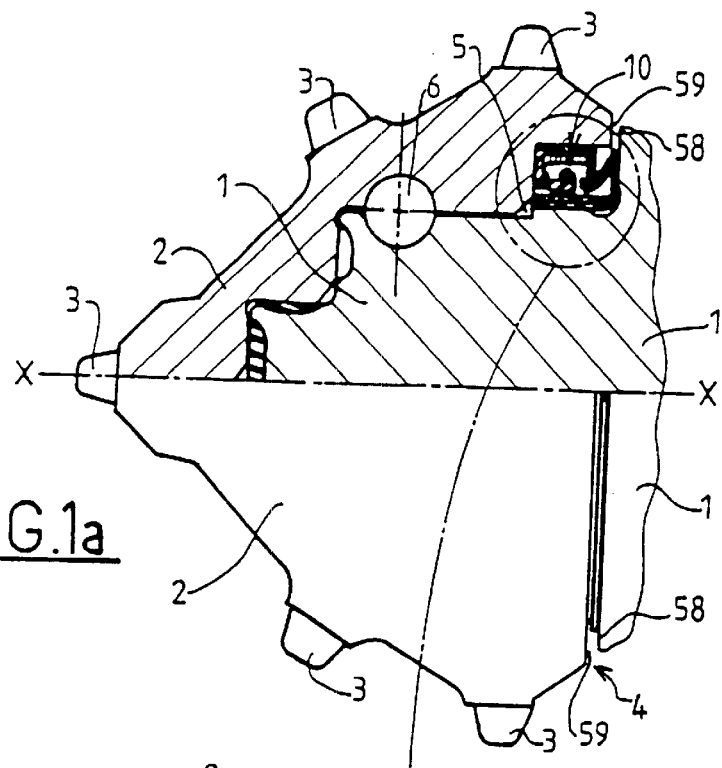
FIG. 1a depicts a part section of a rotary cone equipped with a seal according to the invention.

FIG. 1a depicts a rotary cone of a cone rock bit of the three-cone type, which has a stationary part 1 with an axis XX and a moving part 2 rotated about this axis XX, and which bears abrasive teeth 3. On the upstream side, the moving part 2 is separated from the stationary part 1 by a peripheral groove 4 formed between the upstream face 59 of the moving part 2 and a shoulder 58 of the stationary part 1. This groove which is in contact with the drilling matter, generally a drilling sludge, opens into a cavity which takes a seal 10 intended to protect the moving part 2 from the ingress of drilling sludge. At the opposite end to the groove 4, the housing is in communication with a duct 5 which communicates with the outlet 6 of a pressure-compensating system which delivers under pressure a lubricating fluid which serves, on the one hand, to protect the rolling bearing (s) of the rotary cone and, on the other hand, to lubricate the seal 10.

Figure 1B:
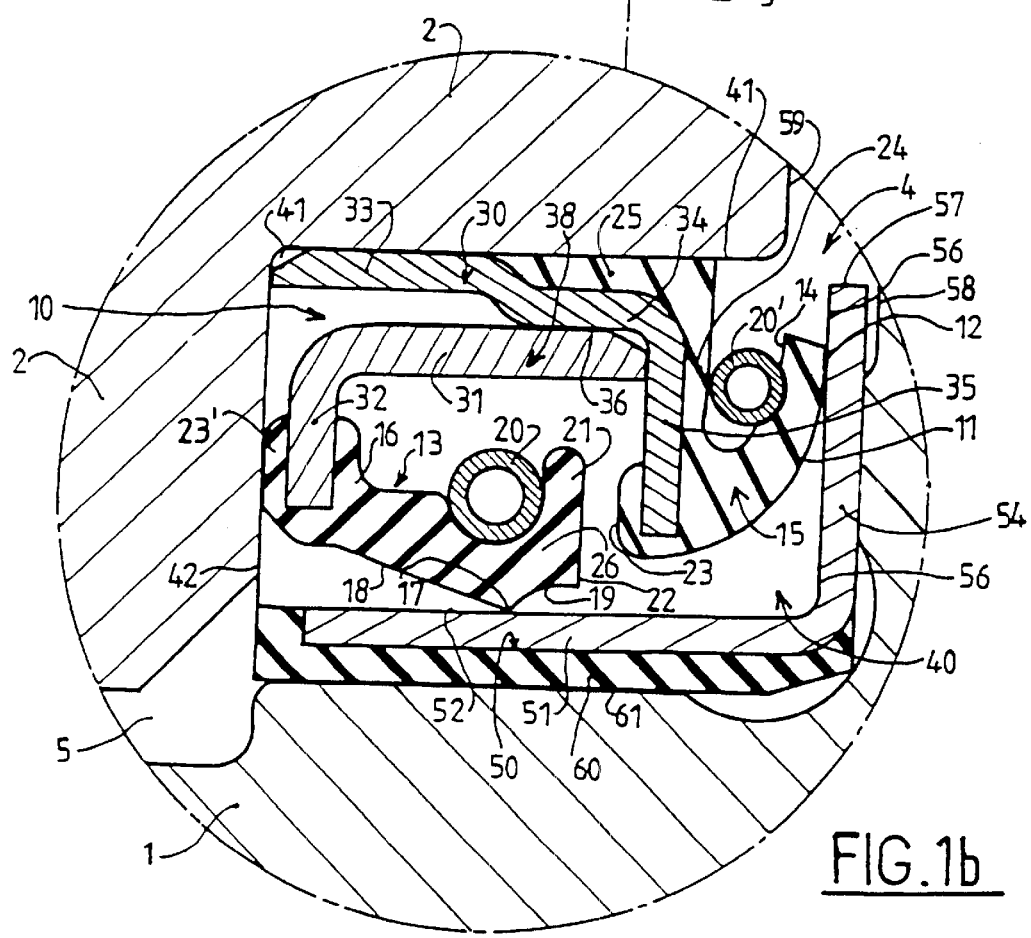

As shown in FIG. 1b, the seal 10 has a first lip 11 which has a concave face 14 facing toward the groove 4 and a convex face 15 facing toward a cavity 40 forming a reservoir for lubricating product. The lip 11 is borne by part of a metal armature 30 which is of revolution about the axis XX and which in section is L-shaped. Two annular regions 23 and 24 flank the short leg 35 of the L to allow the lip 11 to be attached to the piece of armature 30. The long leg of the L has an end region 33 push-fitted onto one face 41 of the moving part 2, and a region 34 which is spaced away from the face 41 so as to house a cylindrical extension 25 of the annular region 24, this extension 25 forming a static seal. As the sealing lip 11 faces toward the groove 4, any increase in pressure of the drilling egg sludge tends to press its contact region 12 against the face 56 of the leg 54 of a piece of armature 50, hence providing positive locking to ensure a positive seal against the drilling sludge.

This piece of armature 50 has a leg 51 at right angles to the leg 54 and which is push-fitted (for example using a ram) onto a cylindrical region 61 of the stationary part 1, with the insertion of an elastomer seal 60 which forms a static seal.

The seal 10 has a second sealing lip 13 which has a cuff 16 and a heel 26 with one face 19 facing toward the cavity 40, and one face 18 facing toward the duct 5, the faces 18 and 19 delimiting a circular sealing sharp edge 17 between them. Furthermore, a spring 20, for example a spring with prestressed turns closed up on itself so as to form a toric annulus, is mounted in a groove in the lip 13 and held in place by a retaining upstand 21. This spring allows the lip 13 to be pressed against the bearing face 52 of the metal armature 50. The lip 11 may also have a spring 201, which may be of the same type as the previous one and which presses on the face 14 to press the contact region 12 against the face 56.

The heel 26 of the lip 13 has a catching upstand 23' on the short leg 32 of a piece of armature 38 which in section is L-shaped and the main leg 31 of which is push-fitted by its cylindrical outer face 36 onto the internal face of the region 34 of the metal armature 30.

As the sealing lip 13 faces toward the cavity 40, an increase in pressure in the duct 5 tends to exert force on the face 18 to lift the sharp edge 17 away from the bearing face 52 and leave a free passage for the lubricant to allow it to fill the cavity 40 and thus lubricate the sealing lip 11.

If the pressure in the duct 5 exceeds the pressure of the drilling sludge, the lubricant tends to lift the lip 11 off its bearing face 56 and emerge in the direction of the groove 4.

By contrast, if the pressure of the lubricant drops below that of the drilling sludge, the lip 11 exerts its positive locking function, while the cavity 40 remains full of lubricant and constitutes a reservoir capable of ensuring continuous lubrication of the active parts 12 and 17 of the lips 11 and 13.

The embodiment of FIG. 2 differs from the one previously described with reference to FIG. 1b in that there is a third sealing lip 70 extending the region 25 and which bears against an annular face 57' of the leg 54 of the metal armature 50.

For this purpose, the leg 54 has an extension 71 which increasees the area of the face 57 and therefore the bearing areaof the lip 70.

Figure 2:
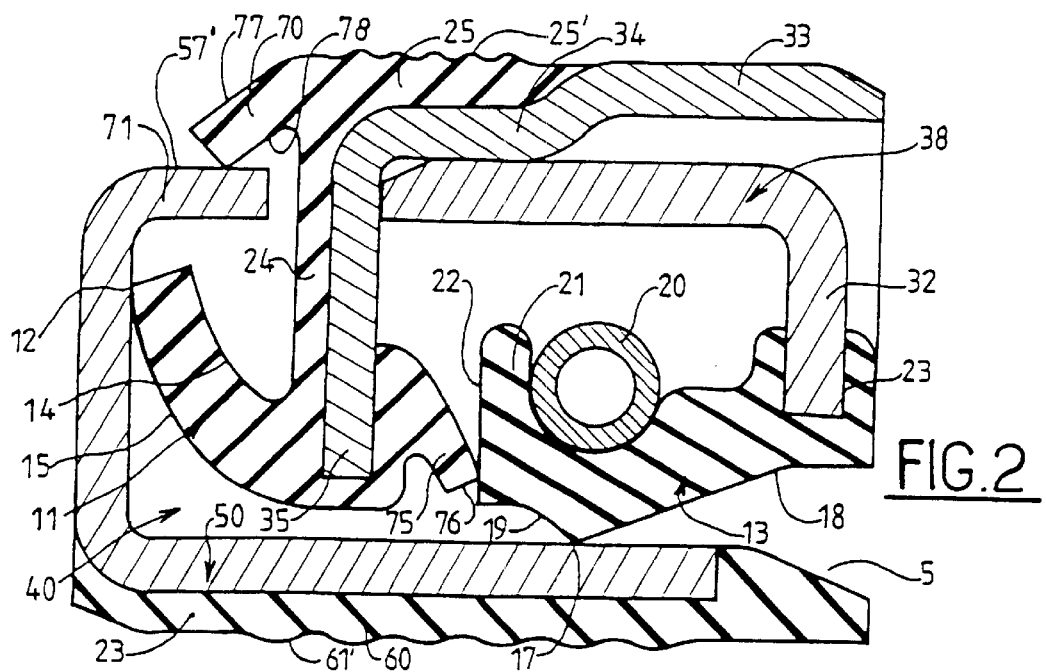
FIG. 2 depicts an alternative form of the seal according to the invention.

The seal in FIG. 2 also has a sealing lip 75 which extends the region 23 of the lip 11 and bears at 76 against the face 22 of the upstand 21, thus limiting the volume of the lubricant reservoir 40. The lip 70 has an outer face 77 facing toward the drilling matter and an inner face 78 facing toward the outer face 14 of the lip 11. It will also be noted that the outer regions 61' and 25' of the regions 23 and 25 have one or more bulges or wavy regions in order to improve the static seal.

Figure 3:
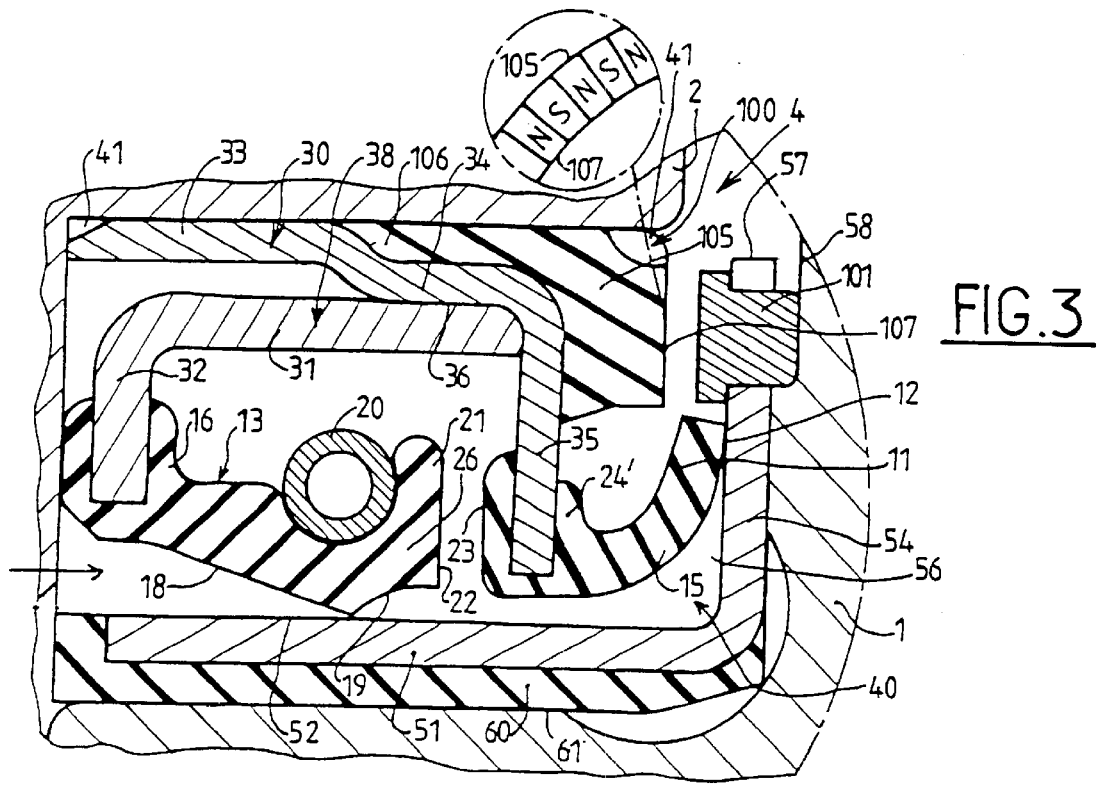
FIG. 3 depicts a preferred embodiment of the invention and allowing the angular displacement of the tool to be decoded.

The seal in FIG. 3 is roughly identical to the seal in FIGS. 1a and 1b except that the lip 15 is fixed to the leg 35 by two annular regions 23 and 24 and that it has a multiple-pole magnetic encoder 100 and a sensor 101 facing one another, one of which is borne by the stationary part 1 and the other of which is borne by the moving part 2. A sensor 101, for example a Hall-effect sensor, is housed in the leg 54, near its end 57, and faces an annular region 105 of a multiple-pole encoder 100 which has a cylindrical region 106 housed, as the extension 25 was earlier, in the space available between the region 34 and the face 41. The region 105 of the multi-pole encoder has at least two magnetic regions, the polarity of which alternates between north and south (see detail). The encoder 100 is made in the form of an elastomeric part which, in these magnetic regions, is filled with ferrite which is then magnetized in a way known per se. A planar annular face 107 of the region 105 faces the sensor 101 for decoding purposes. The encoder 100 is secured to the moving part 2 and the sensor 101 is secured to the stationary part 1. This then yields detection which makes it possible to check that the moving part 2 of the tool is rotating, and possibly allows its rotational speed to be measured and/or controlled.

What is claimed is:

1. A drilling head, comprising:
    a cone rock bit, each cone including:
        a stationary part including a pressure-compensating system configured to deliver a lubricating product at a desired back pressure to compensate for apressure of a drilling matter;
        a rotary part configured to rotate about an axis of rotation; and
        a dynamic sealing device borne by the rotary part and being disposed between the stationary part and the rotary part, and configured to avoid an ingress of drilling matter under said pressure of the drilling matter, and
    said sealing device including:
        a first sealing lip having an outer face facing toward said drilling matter and an inner face facing toward a cavity which forms a reservoir of the lubricating product; and
        a second sealing lip having an outer face facing toward an outlet of the pressure compensating system at said back pressure and an inner face facing toward said cavity, wherein the first and second lips form a surface of revolution about said axis of rotation, and respectively bear against a first bearing face and a second bearing face secured to the stationary part, wherein the first lip is oriented in such a way that it presses against the first bearing face under the action of the pressure of the drilling matter, and wherein the second lip is oriented in such a way that it moves away from the second bearing face under the action of said back pressure of the lubricating product, so as to allow the lubricating product to fill the cavity at said back pressure thereby compensating for the pressure in the cavity.

2. The drilling head according to claim 1, wherein the first bearing face includes a track defined by an annulus, the axis of which is the axis of rotation of the cone, and wherein the second bearing face includes a track defined by a cylinder, the axis of which is the axis of rotation of the cone.

3. The drilling head according to claim 2, wherein the first lip and the second lip include elastomer.

4. The drilling head according to claim 2, wherein the first lip and the second lip are borne by a first armature that revolves about said axis of rotation and which is secured to the rotary part, and wherein at least one of said first and second lips has an extension which forms a static seal between the first armature and a wall of the rotary part.

5. The drilling head according to claim 2, wherein the first bearing face and the second bearing face form part of a second armature including a part that revolves about said axis of rotation and which is secured to the stationary part, and wherein the second armature has a static seal configured to form a static seal between the second armature and the stationary part.

6. The drilling head according to claim 2, further comprising:

a third sealing lip with an outer face facing toward said drilling matter, and an inner face facing toward the outer face of the first sealing lip.

7. The drilling head according to claim 2, further comprising:

a multiple-pole magnetic encoder and a sensor facing one another, one of which is borne by the stationary part and the other of which is borne by the moving part.

8. The drilling head according to claim 1, wherein the first lip and the second lip include elastomer.

9. The drilling head according to claim 8, wherein the second lip has an annular bulge with a double chamfer forming a sharp edge which makes the seal.

10. The drilling head according to claim 9, wherein at least one of the first and second lips has a backing spring.

11. The drilling head according to claim 8, where at least one of the first and second lips has a backing spring.

12. The drilling head according to claim 11, wherein the backing spring comprises a spring with prestressed turns forming a toric annulus.

13. The drilling head according to claim 8, wherein the first lip and the second lip are borne by a first armature that revolves about said axis of rotation and which is secured to the rotary part, and wherein at least one of said first and second lips has an extension which forms a static seal between the first armature and a wall of the rotary part.

14. The drilling head according to claim 8, wherein the first bearing face and the second bearing face form part of a second armature including a part that revolves about said axis of rotation and which is secured to the stationary part, and wherein the second armature has a static seal configured to form a static seal between the second armature and the stationary part.

15. The drilling head according to claim 8, further comprising:

a third sealing lip with an outer face facing toward said drilling matter, and an inner face facing toward the outer face of the first sealing lip.

16. The drilling head according to claim 1, wherein the first lip and the second lip are borne by a first armature that revolves about said axis of rotation and which is secured to the rotary part, and wherein at least one of said first and second lips has an extension which forms a static seal between the first armature and a wall of the rotary part.

17. The drilling head according to claim 16, wherein the first armature includes at least two parts joined together.

18. The drilling head according to claim 1, wherein the first bearing face and the second bearing face form part of a second armature including a part that revolves about said axis of rotation and which is secured to the stationary part, and wherein the second armature has a static seal configured to form a static seal between the second armature and the stationary part.

19. The drilling head according to claim 1, further comprising:

a third sealing lip with an outer face facing toward said drilling matter, and an inner face facing toward the outer face of the first sealing lip.

20. The drilling head according to claim 1, further comprising:

a multiple-pole magnetic encoder and a sensor facing one another, one of which is borne by the stationary part and the other of which is borne by the moving part.

* * * * *